United States Patent
Park et al.

(10) Patent No.: US 7,605,870 B2
(45) Date of Patent: Oct. 20, 2009

(54) DIGITAL VIDEO SIGNAL PROCESSING APPARATUS AND METHOD FOR FRAME-BASED ADAPTIVE TEMPORAL AND SPATIAL Y/C SEPARATION

(75) Inventors: Sung-cheol Park, Seoul (KR); Hyung-jun Lim, Suwon-si (KR); Jae-hong Park, Seongnam-si (KR); Kyoung-mook Lim, Hwaseong-si (KR); Heo-jin Byeon, Hwaseong-si (KR); Dong-suk Shin, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 712 days.

(21) Appl. No.: 11/331,351

(22) Filed: Jan. 13, 2006

(65) Prior Publication Data

US 2006/0176406 A1  Aug. 10, 2006

(30) Foreign Application Priority Data

Jan. 13, 2005  (KR) .................... 10-2005-0003177

(51) Int. Cl.
 H04N 9/77 (2006.01)
 H04N 9/78 (2006.01)
(52) U.S. Cl. .............. 348/663; 348/665; 348/667; 348/669; 348/670
(58) Field of Classification Search ............. 348/663, 348/665, 667, 669, 670
 See application file for complete search history.

(56) References Cited

U.S. PATENT DOCUMENTS

| 5,473,389 A | * | 12/1995 | Eto et al. ............... 348/669 |
| 5,502,509 A | * | 3/1996 | Kurashita et al. ......... 348/669 |
| 5,541,669 A | * | 7/1996 | Yamaguchi et al. ....... 348/669 |
| 5,585,861 A | * | 12/1996 | Taniguchi et al. ......... 348/669 |
| 5,686,972 A | * | 11/1997 | Kim ...................... 348/663 |
| 5,909,255 A | * | 6/1999 | Hatano .................. 348/663 |
| 5,990,978 A | * | 11/1999 | Kim et al. ............... 348/663 |
| 6,055,024 A | * | 4/2000 | DiMeo et al. ............ 348/668 |
| 6,175,389 B1 | | 1/2001 | Felts, III et al. |
| 6,288,754 B1 | * | 9/2001 | Ito ....................... 348/663 |
| 6,300,985 B1 | * | 10/2001 | Lowe et al. ............. 348/665 |
| 6,504,579 B1 | * | 1/2003 | Scherrer ................. 348/667 |
| 6,674,488 B1 | * | 1/2004 | Satoh .................... 348/663 |
| 6,693,676 B2 | * | 2/2004 | Yamaguchi et al. ....... 348/452 |
| 6,774,954 B1 | * | 8/2004 | Lee ...................... 348/665 |

(Continued)

FOREIGN PATENT DOCUMENTS

JP  2001-224040  8/2001

(Continued)

Primary Examiner—Brian P Yenke
(74) Attorney, Agent, or Firm—Lee & Morse, P.C.

(57) ABSTRACT

A digital video signal processing apparatus and method for frame-based adaptive spatio-temporal Y/C separation. In the digital video signal processing apparatus, an adaptive three-dimensional bandpass filter (3D BPF) performs Y/C separation using local comb filtering/1D band pass filtering/frame comb filtering when the edge direction is fixed vertically/horizontally/temporally according to spatio-temporal local characteristics of an image using spatio-temporal filters. When the edge direction is not fixed horizontally/vertically/temporally, the 3D BPF performs 2D or 3D band pass filtering in all directions. Thus, the 3D BPF continuously carries out comb filtering, 1D band pass filtering, frame comb filtering and 2D/3D band pass filtering according to the spatio-temporal local characteristic of the image.

20 Claims, 9 Drawing Sheets

U.S. PATENT DOCUMENTS

| | | | |
|---|---|---|---|
| 6,795,126 B1 * | 9/2004 | Lee | 348/663 |
| 6,809,778 B2 * | 10/2004 | Shibutani et al. | 348/667 |
| 6,914,638 B2 * | 7/2005 | Tsui | 348/663 |
| 6,956,620 B2 * | 10/2005 | Na | 348/663 |
| 7,046,306 B2 * | 5/2006 | Zhai et al. | 348/666 |
| 7,133,080 B2 * | 11/2006 | Kobayashi et al. | 348/663 |
| 7,176,984 B2 * | 2/2007 | Wu | 348/663 |
| 7,196,736 B2 * | 3/2007 | Ogawa | 348/670 |
| 7,227,587 B2 * | 6/2007 | MacInnis et al. | 348/667 |
| 7,274,408 B2 * | 9/2007 | Shan et al. | 348/669 |
| 7,304,688 B1 * | 12/2007 | Woodall | 348/663 |
| 7,324,163 B2 * | 1/2008 | Bacche | 348/663 |
| 7,420,624 B2 * | 9/2008 | Lin et al. | 348/663 |
| 7,453,525 B2 * | 11/2008 | Renner et al. | 348/702 |
| 2004/0032535 A1 | 2/2004 | Ogawa | |
| 2004/0174464 A1 * | 9/2004 | MacInnis et al. | 348/667 |
| 2004/0174465 A1 * | 9/2004 | MacInnis | 348/667 |
| 2004/0201781 A1 * | 10/2004 | Kobayashi et al. | 348/663 |
| 2006/0077302 A1 * | 4/2006 | Nieuwenhuizen | 348/665 |
| 2007/0153127 A1 * | 7/2007 | MacInnis et al. | 348/667 |

FOREIGN PATENT DOCUMENTS

KR      1997-068682      3/1999

\* cited by examiner

DIGITAL VIDEO SIGNAL PROCESSING APPARATUS AND METHOD FOR FRAME-BASED ADAPTIVE TEMPORAL AND SPATIAL Y/C SEPARATION

BACKGROUND OF THE INVENTION

1. Field of the Invention

The present invention relates to a digital video signal processing apparatus. More particularly, the present invention relates to a digital video signal processing apparatus and method for frame based temporal and spatial Y/C separation in NTSC/PAL (National Television System Committee/Phase Alternation by Line) systems.

2. Description of the Related Art

The display of an NTSC/PAL broadcasting system includes a device for processing a CVBS (Composite Video Blanking Sync) signal, which is a composite of a Y (luminance) signal and a C (chrominance) signal. The C signal is quadrature-amplitude-modulated with a subcarrier frequency fsc. Thus, characteristics of the C signal are determined by its frequency and phase. A digital video signal processing apparatus at a receiving stage separates Y and C signals with reference to the characteristic of the C signal and displays an image based on the separated signals.

Figure 1:
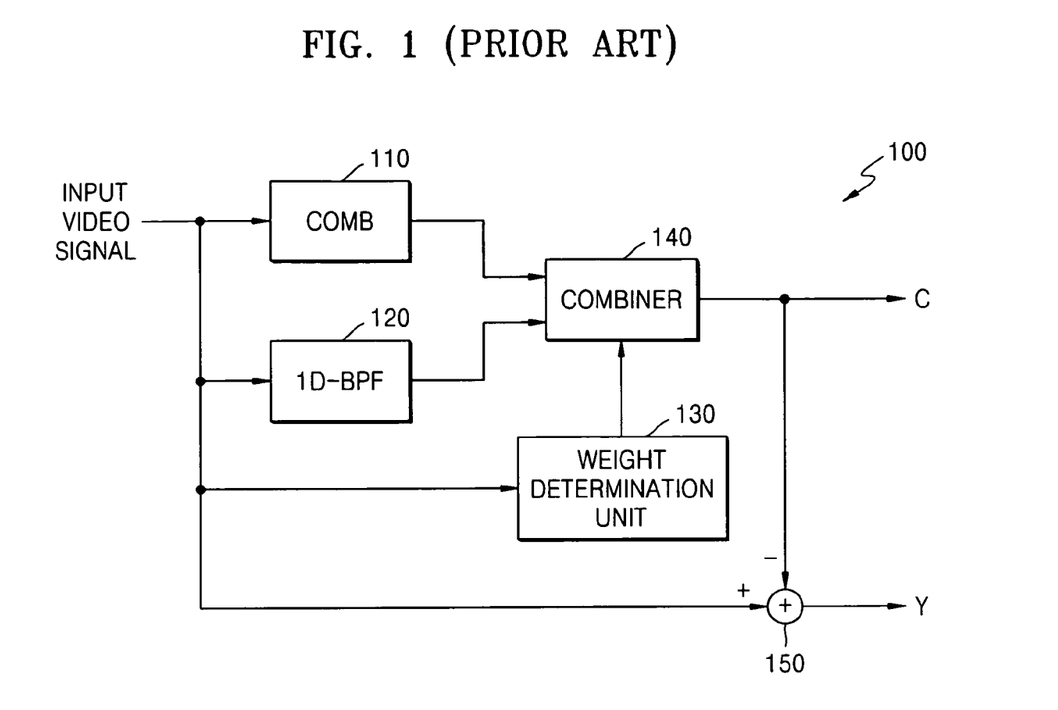
FIG. 1 illustrates a block diagram of a conventional video signal processing apparatus.

FIG. 1 illustrates a block diagram of a conventional video signal processing apparatus 100. Referring to FIG. 1, the video signal processing apparatus 100 includes a comb filter 110, a one-dimensional bandpass filter (1D-BPF) 120, a weight determination unit 130, a combiner 140 and a subtracter 150. The comb filter 110 one-dimensionally band-pass-filters an input video signal in the vertical direction. The 1D-BPF 120 one-dimensionally band-pass-filters the input video signal in the horizontal direction. The weight determination unit 130 determines weights of the output of the comb filter 110 and the output of the 1D-BPF 120 with reference to vertical/horizontal correlation and the phase of a C signal. The combiner 140 combines the output signals of the comb filter 110 and 1D-BPF 120 using the weights to generate a C signal. The subtracter 150 subtracts the C signal from the input CVBS signal to generate a Y signal.

Figure 2:
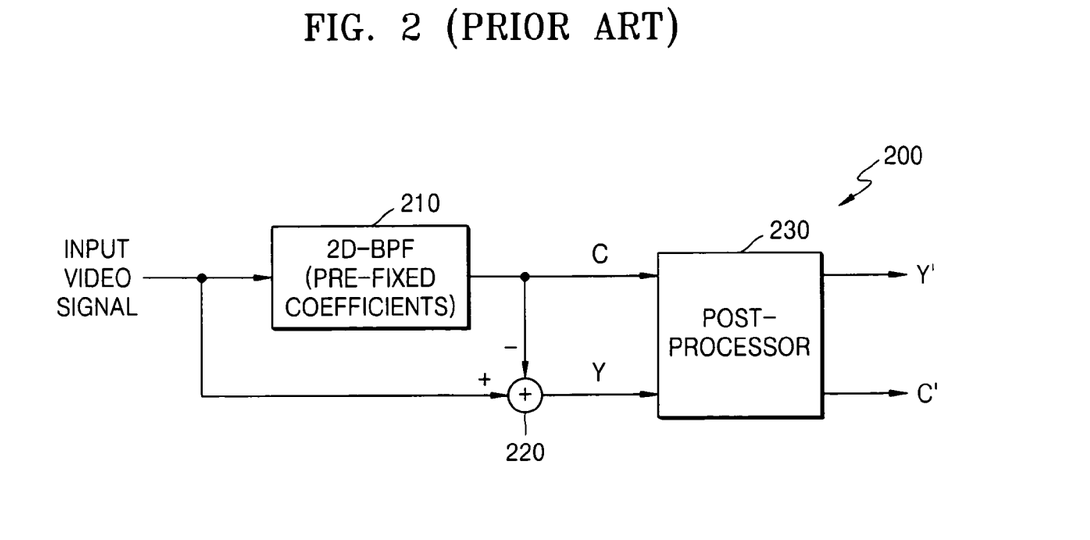
FIG. 2 illustrates a block diagram of another conventional video signal processing apparatus.

FIG. 2 illustrates a block diagram of another conventional video signal processing apparatus 200. Referring to FIG. 2, the video signal processing apparatus 200 includes a 2D-BPF 210, a subtracter 220 and a post-processor 230. The 2D-BPF 210 performs a two-dimensional convolution to extract a modulated C signal. The extracted C signal and a Y signal generated by the subtracter 220 are processed by the post-processor 230. When the 2D-BPF 210 carries out Y/C separation incorrectly, the post-processor 230 compensates the Y/C signal to generate a compensated Y/C signal.

In conventional Y/C separation techniques, when the edge of a detected image has high vertical correlation, Y/C separation is performed based on comb filtering and when the edge of a detected image has high horizontal correlation, Y/C separation is performed based on 1D bandpass filtering. As described above, when selecting one of these filtering methods according to a conventional Y/C separation technique, system performance largely depends on a threshold used for edge detection. That is, Y/C separation can be executed incorrectly or unstably when the filtering method is wrongly selected due to inaccurate edge detection. Conventional techniques that do not select one of the filtering methods but combine the results of the filtering operations can solve this problem to some extent. However, these techniques are based on horizontal or vertical one-dimensional filtering, and thus, artifacts may remain in the generated signal due to the inconstant edge directions.

In other words, when the direction in which the edge of an image extends is not uniform, cross-luma, which occurs when a C component exists in the separated Y signal, resulting in dotted artifacts, and cross-color, which occurs when a Y component exists in the separated C signal, resulting in a rainbow pattern artifact, can appear on a displayed image when Y/C separation is not properly performed by comb filtering or 1D bandpass filtering selected discretely.

To improve spatial filtering, spatio-temporal filtering is used by conventional video signal processing apparatuses. In this case, when processing a current pixel, the correlations of pixel data of the previous field and pixel data of the next field with the current pixel or the correlations of pixel data of the previous frame and pixel data of the next frame with the current pixel is considered. The spatio-temporal filtering method requires a memory for storing the pixel data of the previous and next fields or frames. Although the spatio-temporal filter is more expensive than the spatial filter, the spatio-temporal filtering technique is frequently used when images with high picture quality are required.

However, conventional Y/C separation techniques, which discontinuously select the spatial filter and the spatio-temporal filter in response to an inter-frame/intra-frame correlation of the CVBS signal, generate artifacts such as cross-luma and cross-color when there is an error in the correlation measurement. In addition, the conventional techniques have limitations in two-dimensional spatial Y/C separation.

SUMMARY OF THE INVENTION

The present invention is therefore directed to a digital video signal processing apparatus and method, which substantially overcome one or more of the problems due to the limitations and disadvantages of the related art.

It is a feature of an embodiment of the present invention to adaptively and continuously perform frame-based Y/C separation according to temporal and spatial characteristics of an input video signal.

It is another feature of an embodiment of the present invention to use a spatio-temporal filter having spectral characteristic suitable for Y/C separation of the input video signal.

At least one of the above and other features and advantages of the present invention may be realized by providing a video signal processing method including generating a plurality of 2D weight coefficients and 3D weight coefficients using data of a plurality of frames of an input video signal and generating a C signal of the input video signal including convoluting a horizontal coefficient mask, a vertical coefficient mask and a temporal coefficient mask respectively composed of the plurality of 2D and 3D weight coefficients with corresponding data windows of the data of the plurality of frames, the convoluting including local vertical comb filtering, horizontal band pass filtering, frame comb filtering and 2D/3D band pass filtering according to spatio-temporal local characteristics of the input video signal.

The convoluting may include performing local vertical comb filtering when the local characteristics of the input video signal indicate high vertical correlation, local horizontal band pass filtering when the local characteristics of the input video signal indicate high horizontal correlation, local frame comb filtering when the local characteristics of the input video signal indicate high temporal correlation, and 2D or 3D band pass filtering when the local characteristics of the input video signal indicate high or low correlation in multiple directions using at least three field data of sequential frames.

Generating the C signal may include convoluting a first data window of a first field data of the input video signal with a first filter mask, convoluting a second data window of a second field data of the input video signal with a second filter mask, convoluting a third data window of a third field data of the input video signal with a third filter mask and combining the convolution results to output the C signal, wherein the first, second and third filter masks may be generated by 3D-convoluting the horizontal coefficient mask, the vertical coefficient mask and the temporal coefficient mask.

The first field data and the second field data may have an interval of one frame between them and the second field data and the third field data may have an interval of one frame between them. The horizontal coefficient mask, the vertical coefficient mask and the temporal coefficient mask may each be one-dimensional. Each data window may include vertical and horizontal data having C component phases opposite to a C component phase of the current pixel of each field and diagonal data having a same C component phase as the central pixel.

The 2D weight coefficients may include a first coefficient proportional to vertical and upward correlations with a current pixel, a second coefficient proportional to vertical and downward correlations with the current pixel, a third coefficient proportional to horizontal and leftward correlations with the current pixel and a fourth coefficient proportional to horizontal and rightward correlations with the current pixel.

The 3D weight coefficients may include a first coefficient proportional to a correlation between a current pixel and a pixel one frame prior to the current pixel and a second coefficient proportional to a correlation between the current pixel and pixel one frame after the current pixel.

At least one of the above and other features and advantages of the present invention may be realized by providing video signal processing apparatus including a weight determination unit to generate a plurality of 2D weight coefficients and 3D weight coefficients using data of a plurality of frames of an input video signal and a filter to convolute a horizontal coefficient mask, a vertical coefficient mask and a temporal coefficient mask respectively composed of the weight coefficients with corresponding data windows of the data of the plurality of frames to generate a C signal of the input video signal, wherein the filter adaptively performs local vertical comb filtering, horizontal band pass filtering, frame comb filtering and 2D/3D band pass filtering according to spatio-temporal local characteristics of the input video signal.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 10-2005-0003177, filed on Jan. 13, 2005, in the Korean Intellectual Property Office, and entitled: "Digital Signal Processing Apparatus and Method for Frame-Based Adaptive Temporal and Spatial Y/C Separation," is incorporated by reference herein in its entirety.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 3:
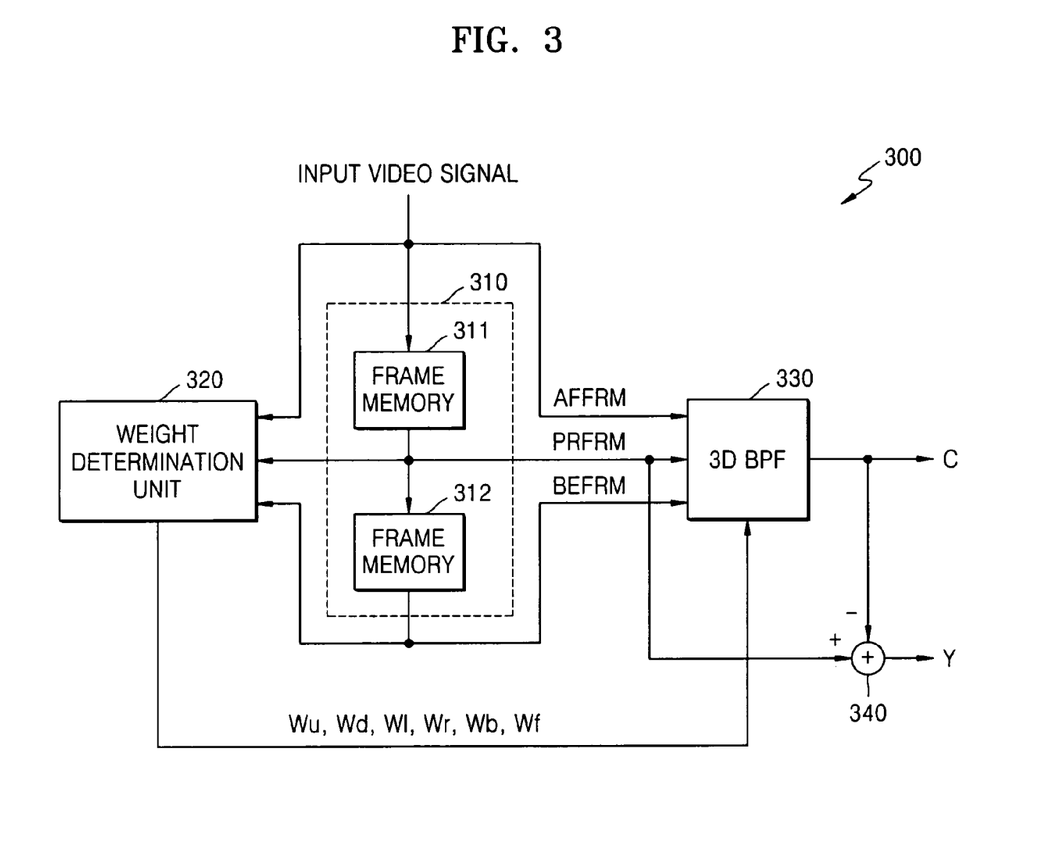
FIG. 3 illustrates a block diagram of a video signal processing apparatus according to an embodiment of the present invention.

FIG. 3 illustrates a block diagram of a video signal processing apparatus 300 according to an embodiment of the present invention. Referring to FIG. 3, the video signal processing apparatus 300 includes a memory 310, a weight determination unit 320, a three-dimensional bandpass filter (3D BPF) 330 and a subtracter 340. The video signal processing apparatus 300 can be used for an NTSC system. The video signal processing apparatus 300 receives a digital CVBS signal as an input video signal and separates it into a Y signal and a C signal. The input video signal can be a digital signal obtained by sampling the active video region of an analog CVBS signal at a predetermined frequency, e.g., $4f_{sc}$, where $f_{sc}$ is a subcarrier frequency.

Figure 4:
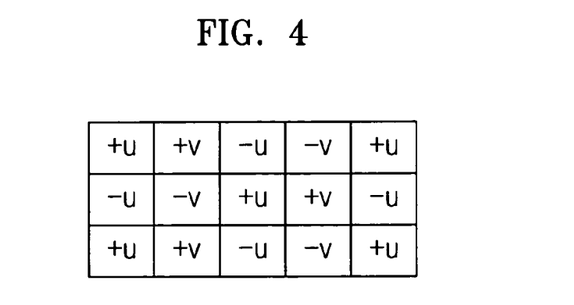
FIG. 4 illustrates phases of a chrominance signal in an NTSC system.
Figure 5:
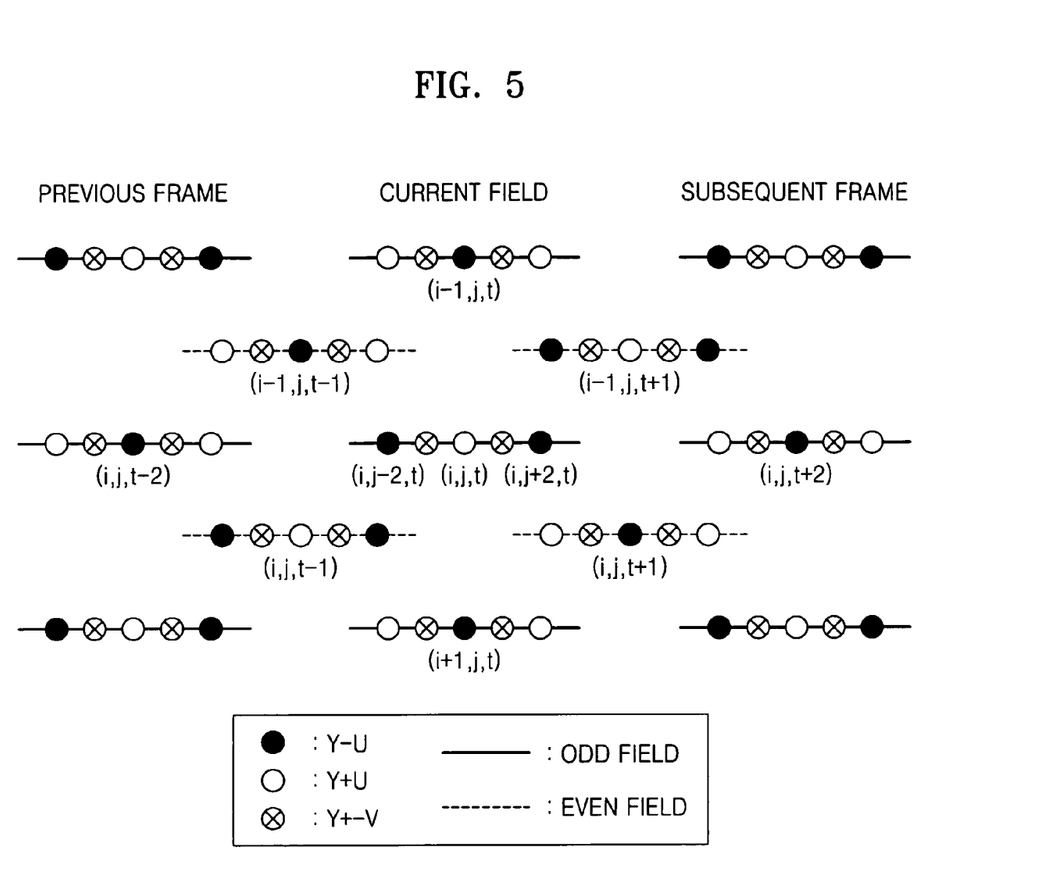
FIG. 5 illustrates phases of a spatial-temporal chrominance signal in the NTSC system.

An input video signal CVBS(t) in the NTSC system can be represented as follows.

$$CVBS(t) = Y + U^* \sin 2\pi f_{sc} t + V^* \cos 2\pi f_{sc} t \quad \text{[Equation 1]}$$

where U and V are C components, $f_{sc}$ is a subcarrier frequency and t is time. In the NTSC system, pixel signals sampled at $4f_{sc}$ have chrominance signal phases as illustrated in FIG. 4. As can be seen therein, the pixel signals are repeated in the form of Y+U, Y+V, Y−U, Y−V, . . . for each horizontal line. FIG. 4 illustrates only the phases of the chrominance signal component. In the NTSC system, the chrominance signal phases are shifted by 180° in neighboring horizontal scan lines, as illustrated in FIG. 4.

Figure 6:
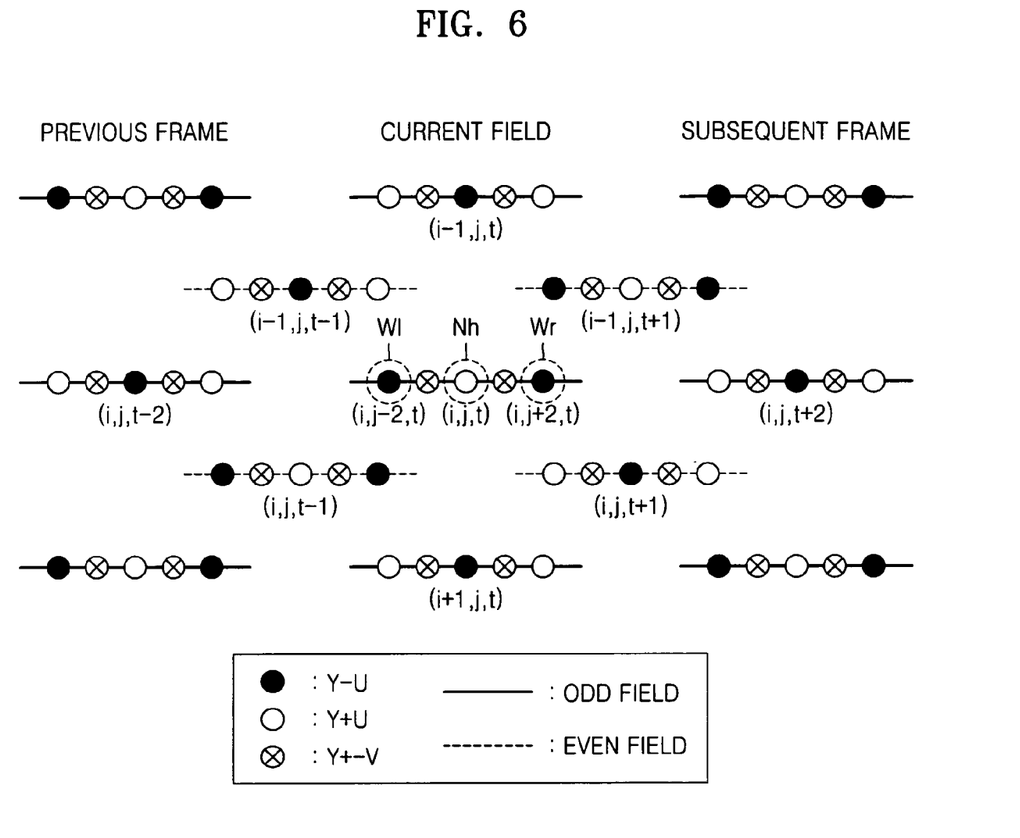
FIG. 6 illustrates a diagram for explaining a horizontal filter coefficient.

The input video signal CVBS(t) of the NTSC system may be represented spatio-temporally as illustrated in FIG. 6. Referring to FIG. 6, the phase of the C component of the currently processed central pixel at (i, j, t) may have a particular phase, e.g., +U. Pixel signals spatio-temporally disposed in a first diagonal direction from the central pixel, i.e., a pixel at (i−1, j, t+1) of the next field and a pixel at (i, j, t−1) of the previous field, have the same phase as the central pixel. Pixel signals spatio-temporally disposed in a second diagonal direction from the central pixel, i.e., a pixel at (i, j, t+1) of the next field and a pixel at (i−1, j, t−1) of the previous pixel, have a phase opposite the phase, e.g., −U, of the C component of the central pixel at (i, j, t). In the NTSC system, each frame is composed of two fields, i.e., an odd field and an even field.

The Y and C signals (U and V signals) separated by the video signal processing apparatus 300 may be converted to a format required for an external circuit and then stored or transmitted to a display device. For example, the Y and C signals may be interpolated with three color signals, e.g., red, green and blue color signals, to be displayed on a liquid crystal display (LCD).

Rather than discretely carrying out spatio-temporal comb filtering or 1D band pass filtering, the video signal processing apparatus 300 according to an embodiment of the present invention adaptively operates in response to spatio-temporal local characteristics of the input video signal CVBS. For this, the memory 310 stores digital field data corresponding to a plurality of frames of the input video signal. The memory 310 includes a plurality of frame memories 311 and 312, each storing data corresponding to one frame, i.e., two fields. While FIG. 3 illustrates only two frame memories 311 and 312, more frame memories can be added to the digital video signal processing apparatus 300 if required for filtering.

The data corresponding to the plurality of frames, stored in the memory 310, and currently input video data are output to the weight determination unit 320. The weight determination unit 320 generates 2D weight coefficients Wu, Wd, Wl and Wr and 3D weight coefficients Wb and Wf, which will be used for filtering in the 3D BPF 330, using the plurality of frame data.

In operation, the 3D BPF 330 generates the C signal of the input video signal using the 2D weight coefficients Wu, Wd, Wl and Wr and the 3D weight coefficients Wb and Wf. The subtracter 340 subtracts the C signal (U or V signal) of the currently processed pixel from the input composite video signal to obtain the Y signal. For example, when the U signal output as the C signal is subtracted from the input composite video signal of the current pixel Y+U, the Y signal is obtained.

The 3D BPF 330 may adaptively perform local vertical comb filtering, horizontal band pass filtering, frame comb filtering and 2D/3D band pass filtering in a continuous manner according to spatio-temporal local characteristics of the input video signal. That is, the 3D BPF 330 may perform filtering using at least three field data of sequential frames and 3D filter masks defined in the spatial-temporal domain. The 3D BPF 330 may perform local vertical comb filtering when the local characteristics of the input video data indicate high spatial vertical correlation, local horizontal band pass filtering when the local characteristics of the input video signal indicate high spatial horizontal correlation, local frame comb filtering when the local characteristics of the input video data indicate high temporal correlation and 2D or 3D band pass filtering when the local characteristics of the input video signal indicate high or low correlation in multiple directions.

The 3D BPF 330 may perform filtering using the filter masks, i.e., a horizontal coefficient mask, a vertical coefficient mask and a time coefficient mask, which are composed of the 2D weight coefficients Wu, Wd, Wl and Wr and the 3D weight coefficients Wb and Wf. When the horizontal coefficient mask is $h_h(i, j, t)$, the vertical coefficient mask is $h_v(i, j, t)$ and the time coefficient mask is $h_t(i, j, t)$, the C signal C(i, j, t) output from the 3D BPF 330 may be represented as follows.

$$C(i,j,t)=h(i,j,t)***CVBS(i,j,t)$$

$$h(i,j,t)=h_h(i,j,t)*h_v(i,j,t)*h_t(i,j,t) \quad \text{[Equation 2]}$$

That is, the 3D BPF 330 may 3D-convolute the horizontal coefficient mask $h_h(i, j, t)$, the vertical coefficient mask $h_v(i, j, t)$, the time coefficient mask $h_t(i, j, t)$ and a corresponding data window CVBS(i, j, t) of the field data stored in the memory 310 to output the C signal C(i, j, t) of the input video signal. The Y signal Y(i, j, t) output from the subtracter 340 may be obtained by subtracting the C signal C(i, j, t) from the CVBS data CVBS(i, j, t) of the currently processed central pixel as follows.

$$Y(i,j,t)=CVBS(i,j,t)-C(i,j,t) \quad \text{[Equation 3]}$$

The horizontal coefficient mask $h_h(i, j, t)$, the vertical coefficient mask $h_v(i, j, t)$ and the time coefficient mask $h_t(i, j, t)$ may be 1-dimensional as shown below.

$$h_h(i, j, t) = [\, Wl \quad 0 \quad Nh \quad 0 \quad Wr\,] \quad \text{[Equation 4]}$$

$$h_t(i, j, t) = [\, Wb \quad Nt \quad Wf\,]$$

$$h_v = \begin{bmatrix} Wu \\ Nv \\ Wd \end{bmatrix}$$

In Equation 4, the coefficients Nh, Nv and Nt may be normalizing values that ensure that the sum of the respective absolute values of Nh, Nv and Nt and the respective absolute values of the 2D weight coefficients and 3D weight coefficients is 1.

The 3D spatial masks obtained from the three 1D coefficient masks $h_h(i, j, t)$, $h_v(i, j, t)$ and $h_t(i, j, t)$ may be given by the following.

$$h_1(i, j, t) = \begin{bmatrix} Wb\cdot Wl\cdot Wu & 0 & Wb\cdot Wu & 0 & Wb\cdot Wr\cdot Wu \\ Wb\cdot Wl & 0 & Ns\cdot Wb & 0 & Wb\cdot Wr \\ Wb\cdot Wl\cdot Wd & 0 & Wb\cdot Wd & 0 & Wb\cdot Wr\cdot Wd \end{bmatrix} \quad \text{[Equation 5]}$$

$$h_2(i, j, t) = \begin{bmatrix} Nt\cdot Wl\cdot Wu & 0 & Nt\cdot Wu & 0 & Nt\cdot Wr\cdot Wu \\ Nt\cdot Wl & 0 & Ns\cdot Nt & 0 & Nt\cdot Wr \\ Nt\cdot Wl\cdot Wd & 0 & Nt\cdot Wd & 0 & Nt\cdot Wr\cdot Wd \end{bmatrix}$$

$$h_1(i, j, t) = \begin{bmatrix} Wf\cdot Wl\cdot Wu & 0 & Wf\cdot Wu & 0 & Wf\cdot Wr\cdot Wu \\ Wf\cdot Wl & 0 & Ns\cdot Wf & 0 & Wf\cdot Wr \\ Wf\cdot Wl\cdot Wd & 0 & Wf\cdot Wd & 0 & Wf\cdot Wr\cdot Wd \end{bmatrix}$$

Accordingly, the data CVBS(i, j, t) used for the convolution of the 3D BPF 330 represented by Equation 2 may include three data windows respectively corresponding to the 3D coefficient masks $h_1(i, j, t)$, $h_2(i, j, t)$ and $h_3(i, j, t)$. That is, CVBS data of a 3×5 matrix corresponding to each of the filer masks of Equation 5 may be used for the convolution of Equation 2. In Equation 5, $h_2(i, j, t)$ is the coefficient mask for the current field, $h_1(i, j, t)$ is the coefficient mask for a field one frame prior to the current field and $h_3(i, j, t)$ is the coefficient mask for a field one frame after the current field. That is, respective three field data BEFID (before field), PRFID (present field) and AFFID (after field) of sequential frames may be used for the 3D convolution of Equation 2. In Equation 5, Ns=Nh*Nv.

In particular, field data corresponding to non-zero elements in Equation 5, i.e., vertical and horizontal data, which have C component phases (−U in FIG. 4) opposite the phase of the central pixel (+U in FIG. 4), and diagonal data, which have C component phases (+U in FIG. 4) identical to the phase of the central pixel (+U in FIG. 4), among digital data of three sequential horizontal scan lines in each field data may be used for the convolution.

In Equations 4 and 5, 2D weights Wu, Wd, Wl and Wr may be applied to the pixels having phases opposite the phase of the central pixel at (i, j) in the currently processed field, and may have values between −0.5 and 0, inclusive, according to spatial local characteristics of an image. Accordingly, diagonal weights WuWl, WdWl, WuWr and WdWr may have values between 0 and 0.25, inclusive, according to the local characteristics of the image. In addition, the 3D weight coefficients Wb and Wf may be used for reflecting a temporal motion variation. The 3D weight coefficients Wb and Wf may have values between −0.5 and 0, inclusive, and may have any value that represents temporal correlation.

Figure 7:
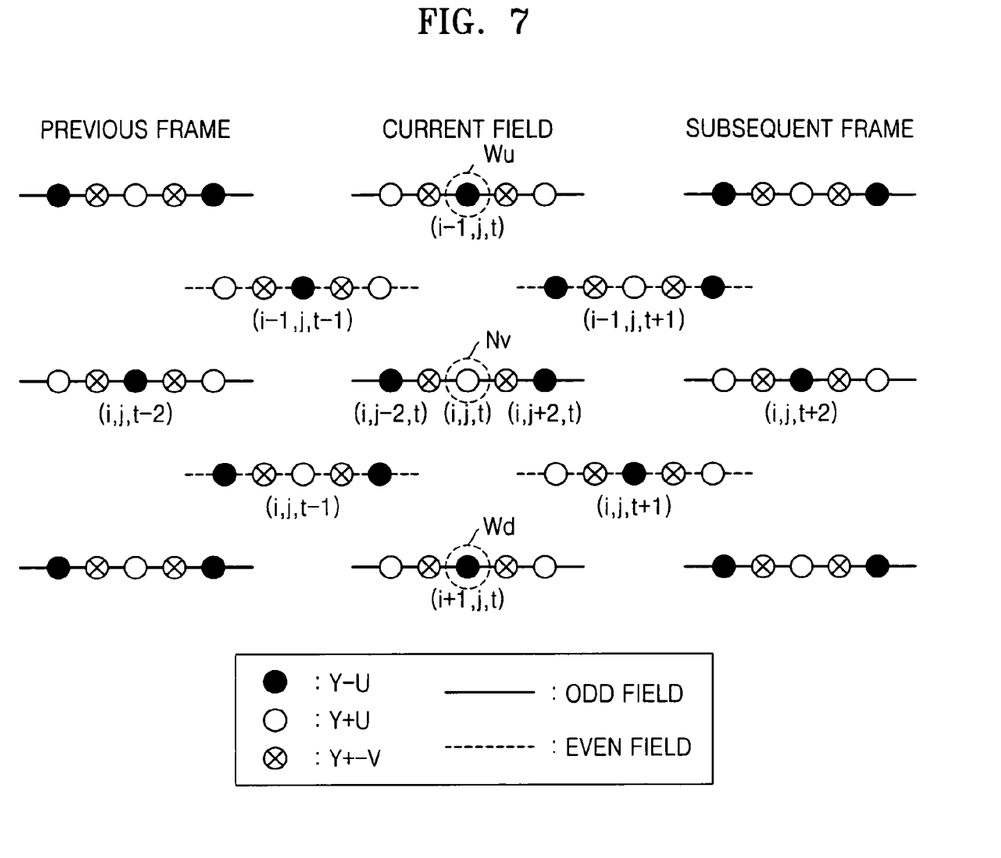
FIG. 7 illustrates a diagram for explaining a vertical filter coefficient.
Figure 8:
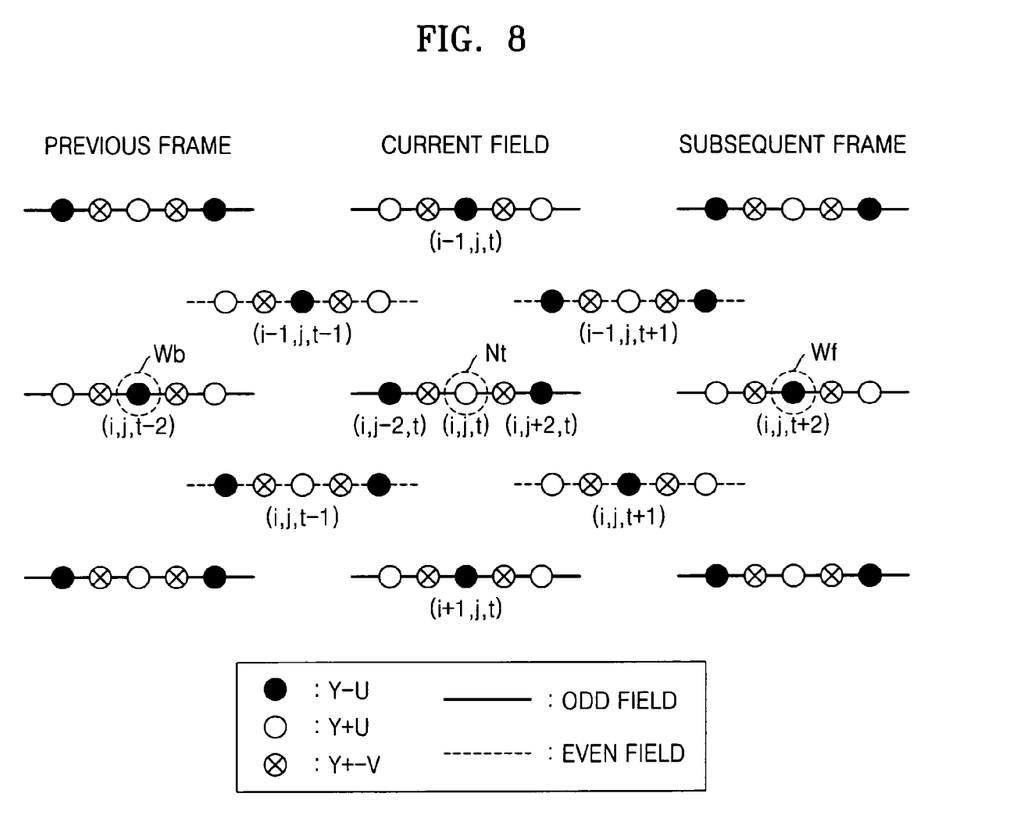
FIG. 8 illustrates a diagram for explaining a temporal filter coefficient.

Specifically, referring to FIG. 6, Nh may be applied to the current central pixel at (i, j, t), Wl may be applied to a pixel at (i, j−2, t) located two pixels to the left of the current central pixel and Wr may be applied to a pixel at (i, j+2, t), located two pixels to the right of the current central pixel. Referring to FIG. 7, Nv may be applied to the current central pixel at (i, j, t), Wu may be applied to a pixel at (i−1, j, t) one horizontal scan line above the current central pixel and Wd may be applied to a pixel at (i+1, j, t) one horizontal scan lines below the central pixel. Referring to FIG. 8, Nt may be applied to the current central pixel at (i, j, t), Wb may be applied to a pixel at (i, j, t−2) located one frame prior to the current field and Wf may be applied to a pixel at the point (i, j, t+2) located one frame after the current field.

The 2D weight coefficients Wu, Wd, Wl and Wr and 3D weight coefficients Wb and Wf used in Equations 4 and 5 may be determined such that they satisfy Equation 6.

$$|Wu| \propto (VARh \ \& VARt) \left( or \ \frac{1}{VARv} \right) \text{ and } |Wu| \propto \frac{1}{VARu} (or \ VARd)$$

$$|Wd| \propto (VARh \ \& VARt) \left( or \ \frac{1}{VARv} \right) \text{ and } |Wd| \propto \frac{1}{VARd} (or \ VARu)$$

$$|Wl| \propto (VARv \ \& VARt) \left( or \ \frac{1}{VARh} \right) \text{ and } |Wl| \propto \frac{1}{VARl} (or \ VARr)$$

$$|Wr| \propto (VARv \ \& VARt) \left( or \ \frac{1}{VARh} \right) \text{ and } |Wr| \propto \frac{1}{VARr} (or \ VARl)$$

$$|Wb| \propto (VARv \ \& VARh) \left( or \ \frac{1}{VARt} \right) \text{ and } |Wb| \propto \frac{1}{VARb} (or \ VARf)$$

$$|Wf| \propto (VARv \ \& VARh) \left( or \ \frac{1}{VARt} \right) \text{ and } |Wf| \propto \frac{1}{VARf} (or \ VARb)$$

[Equation 6]

In Equation 6, VARv is a vertical variation in the spatial domain, VARh is a horizontal variation in the spatial domain, VARt is a temporal variation in the time domain, VARu is an upward variation in the spatial domain, VARd is a downward variation in the spatial domain, VARl is a leftward variation in the spatial domain, VARr is a rightward variation in the spatial domain, VARb is a previous variation in the time domain and VARf is a subsequent variation in the time domain.

In an embodiment of the present invention, Equation 6 may be as represented as follows.

$$Wu = -0.5 \times \frac{Difh + Dift}{Difh + Difv + Dift} \times \frac{Difd}{Difu + Difd}$$

$$Wd = -0.5 \times \frac{Difh + Dift}{Difh + Difv + Dift} \times \frac{Difu}{Difu + Difd}$$

$$Wl = -0.5 \times \frac{Difv + Dift}{Difh + Difv + Dift} \times \frac{Difr}{Difl + Difr}$$

$$Wr = -0.5 \times \frac{Difv + Dift}{Difh + Difv + Dift} \times \frac{Difl}{Difl + Difr}$$

$$Wf = -0.5 \times \frac{Difv + Difh}{Difh + Difv + Dift} \times \frac{Difb}{Diff + Difb}$$

$$Wb = -0.5 \times \frac{Difv + Difh}{Difh + Difv + Dift} \times \frac{Diff}{Diff + Difb}$$

[Equation 7]

In Equation 7, Difv is the absolute value of a vertical difference of the input video signal, Difh is the absolute value of a horizontal difference, Difu is the absolute value of an upward difference, Difd is the absolute value of a downward difference, Difl is the absolute value of a leftward difference and Difr is the absolute value of a rightward difference.

Figure 9:
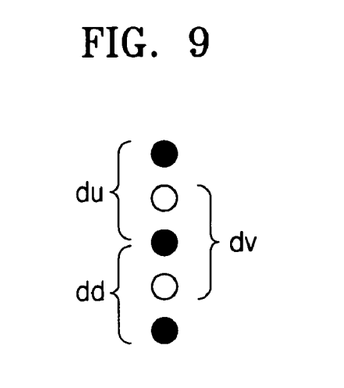
FIG. 9 shows a vertical variation in pixels.
Figure 10:
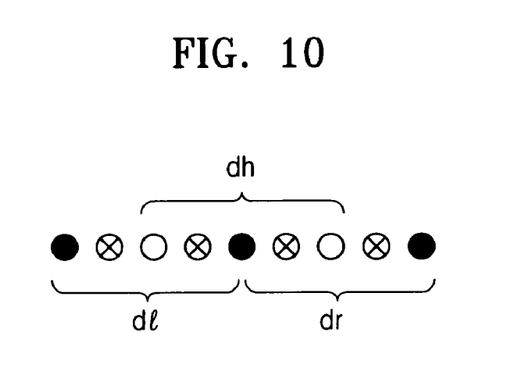
FIG. 10 shows a horizontal variation in pixels.

Referring to FIG. 9, Difv=du+dd+dv, Difu=du and Difd=dd. Referring to FIG. 10, Difh=dl+dr+dh, Difl=dl and Difr=dr. Here, du is the absolute value of the difference between the pixel data at (i, j) and the pixel data at (i−2, j), dd represents the absolute value of the difference between the pixel data at (i, j) and the pixel data at (i+2, j), dv is the absolute value of the difference between the pixel data at (i−1, j) and the pixel data at (i+1, j), dl is the absolute value of the difference between the pixel data at (i, j) and the pixel data at (i, j−4), dr is the absolute value of the difference between the pixel data at (i, j) and the pixel data at (i, j+4), and dh is the absolute value of the difference between the pixel data at (i, j−2) and the pixel data at (i, j+2). Furthermore, Dift is a variation on the time axis, and Diff and Difb represent variations in subsequent and previous frame directions. Here, Dift, Diff and Difb may be calculated by combining pixels having the same phase as that of the current pixel on the time axis.

In Equation 7, the absolute value of the difference between pixel data having the same phase may be used and data of five sequential horizontal scan lines may be used to calculate the absolute values. In addition, the weights Wu, Wd, Wl, Wr, Wf and Wb may be determined such that they represent horizontal/vertical/temporal/leftward/rightward/upward/downward variations using various combinations of pixel data having the same phase. Consequently, Wu is proportional to vertical and upward correlations with the central pixel.

Referring to Equation 7, Wu is proportional to a vertical correlation or is inversely proportional to a horizontal correlation and a temporal correlation and is proportional to an upward correlation or inversely proportional to a downward correlation. Wd is proportional to a vertical correlation or inversely proportional to a horizontal correlation and a temporal correlation and is proportional to a downward correlation or inversely proportional to an upward correlation. Wl is proportional to a horizontal correlation and a leftward correlation. Specifically, Wl is proportional to a horizontal correlation or inversely proportional to a vertical correlation and a temporal correlation and is proportional to a leftward correlation or inversely proportional to a rightward correlation. Wr is proportional to a horizontal correlation and a rightward correlation. Specifically, Wr is proportional to a horizontal correlation or inversely proportional to a vertical correlation and a temporal correlation and is proportional to a rightward correlation or inversely proportional to a leftward correlation.

Wb is proportional to a correlation between central pixel data and data of a field one frame prior to the current pixel. Referring to FIG. 8, Wb is representative of the difference between the central pixel at (i, j, t) and a pixel located at (i, j, t−2) one frame prior to the current pixel having the same phase as the central pixel. Wf is proportional to a correlation between the central pixel at (i, j, t) and a pixel located at (i, j, t+2) one frame after the current pixel having the same phase as the central pixel. Referring to Equation 7, Wb is proportional to a temporal correlation or is inversely proportional to a spatial correlation and is proportional to a correlation between the current pixel data and data of a field one frame prior to the current pixel or inversely proportional to a correlation between the central pixel data and data of a field one frame after the current pixel. Wf is proportional to a temporal correlation or is inversely proportional to a spatial correlation and proportional to a correlation between the current pixel and the pixel one frame after the current pixel or is inversely proportional to a correlation between the current pixel and the pixel one frame prior to the current pixel.

Figure 11:
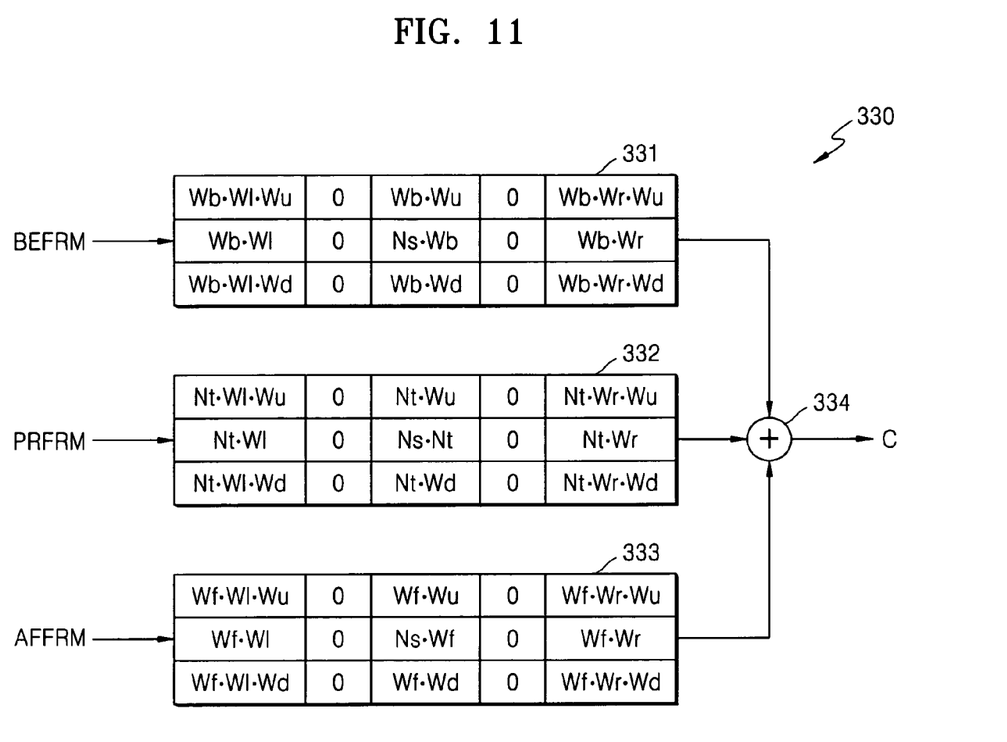
FIG. 11 illustrates a block diagram of a 3D BPF of the video signal processing apparatus illustrated in FIG. 3.

The 3D BPF 330 may perform filtering through the convolution of Equation 3 using the weight coefficients Wu, Wd, Wl, Wr, Wb and Wf, which may be determined as described above. FIG. 11 is a block diagram of the 3D BPF 330 of FIG. 3. Referring to FIG. 11, the 3D BPF 330 may include a first filter 331, a second filter 332, a third filter 333, and a combiner 336.

The first filter 331 may use the filter mask $h_1(i, j, t)$ in Equation 5. The first filter 331 may convolute a corresponding data window of a first field data BEFRM (before frame) of the input video signal with the filter mask $h_1(i, j, t)$. The data window of the first field data BEFRM exists in field data one frame prior to a second field data PRFRM (present frame) currently being processed. That is, data corresponding to non-zero elements in Equation 5 among digital data of three sequential horizontal scan lines of the field data BEFRM one frame prior may be used. These data may include vertical and horizontal data having C component phases opposite the phase of the central pixel and diagonal data having the same C component phases as the central pixel.

The second filter 332 may use the filter mask $h_2(i, j, t)$ in Equation 5. The second filter 332 may convolute a corresponding data window of the second field data PRFRM of the input video signal with the filter mask $h_2(i, j, t)$. The data window of the second field data PRFRM exists in the currently processed field data. That is, data corresponding to non-zero elements in Equation 5 among digital data of three sequential horizontal scan lines of the current field data PRFRM are used. These data include vertical and horizontal data having C component phases opposite the phase of the central pixel and diagonal data having the same C component phases as the central pixel.

The third filter 333 may use the filter mask $h_3(i, j, t)$ in Equation 5. The third filter 333 may convolute a corresponding data window of a third field data AFFRM (after frame) of the input video signal with the filter mask $h_3(i, j, t)$. The data window of the third field data AFFRM exists in field data one frame after the second field data PRFRM currently processed. That is, data corresponding to non-zero elements in Equation 5 among digital data of three sequential horizontal scan lines of the field data AFFRM one frame after may be used. These data include vertical and horizontal data having C component phases opposite the phase of the central pixel and diagonal data having the same C component phases as the central pixel.

The combiner 334 may combine the convolution results of the first, second and third filters 331, 332 and 333 and output the combined result as the C signal. Through the aforementioned operation, the 3D BPF 330 adaptively carries out comb filtering, 1D band pass filtering, frame comb filtering and 2D/3D band pass filtering in a continuous manner according to spatio-temporal local characteristics of the input video signal.

Figure 12:
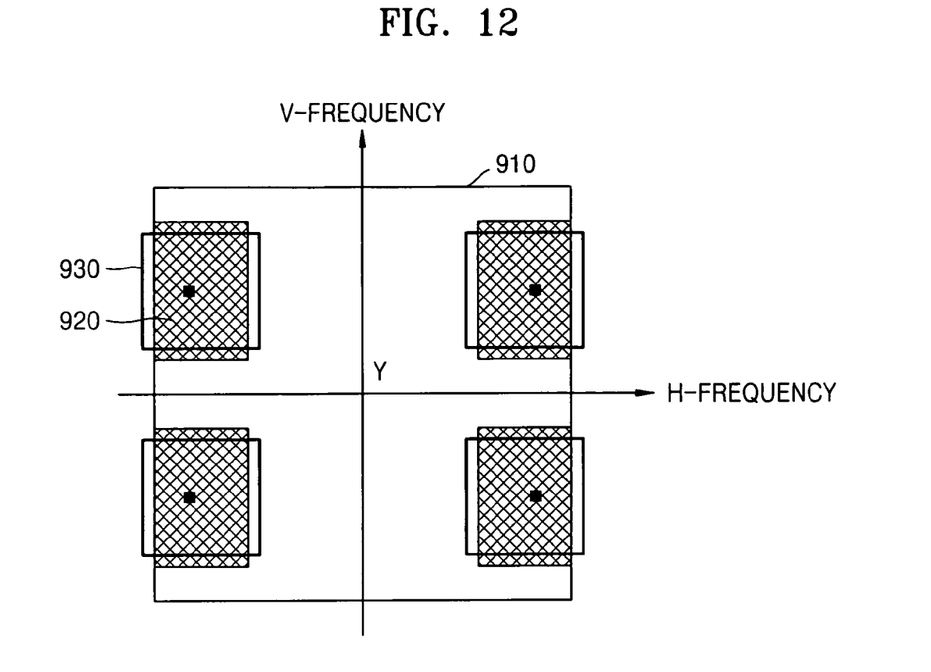
FIG. 12 illustrates spectral characteristics representing C and Y components in horizontal and vertical frequencies of a video signal.
Figure 13:
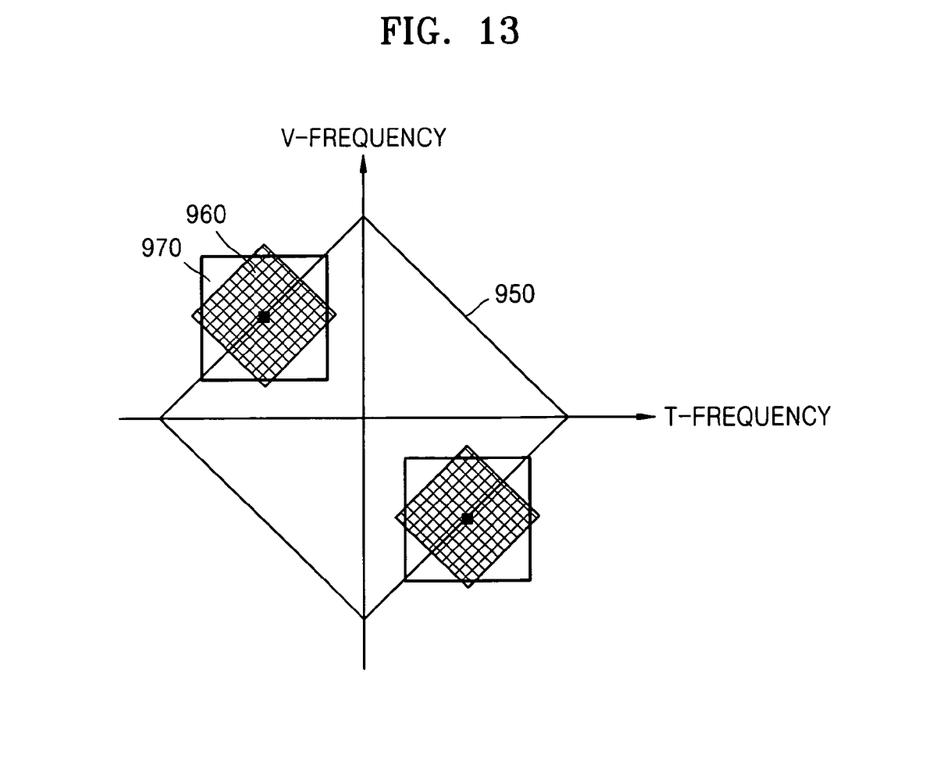
FIG. 13 illustrates spectral characteristics representing C and Y components in temporal and vertical frequencies of a video signal.

For example, when a correlation is high or low in all directions of the spatio-temporal domain, all the 2D weight coefficients Wu, Wd, Wl and Wr and the 3D weight coefficients Wb and Wf in Equation 6 affect the filtering operation of the 3D BPF 330. Accordingly, in the spectral characteristic with respect to horizontal and vertical frequencies H and V, shown in FIG. 12, a high frequency component 920 of the C signal, included in a Y component 910, may be extracted distinctly as shown by an extracted form 930, to thereby remove artifacts. Specifically, using the weight coefficients in Equation 6 to average surrounding pixels stabilizes the signal when correlation is high in all directions. When correlation is low in all directions, the C component is separated in its most distinct form and thus cross-color artifacts are minimized and the high frequency component of the Y signal is distinct. Similarly, in the spectral characteristic with respect to temporal and vertical frequencies T and V, shown in FIG. 13, a high frequency component 960 of the C signal, included in a Y component 950, may be extracted distinctly as shown by a extracted form 970, to thereby remove artifacts.

On the other hand, when correlation is spatio-temporally high in a specific direction, weight coefficients corresponding to the direction become large while weight coefficients corresponding to the other directions become small. Thus, comb filtering, 1D band pass filtering, frame comb filtering or 2D/3D filtering may be performed on pixels surrounding the central pixel to separate Y and C signals, thereby minimizing artifacts.

As described above, in the video signal processing apparatus 300 according to the present invention, the adaptive 3D BPF 330 carries out Y/C separation according to local comb filtering/1D band pass filtering/frame comb filtering when the edge direction is fixed vertically/horizontally/temporally according to spatio-temporal local characteristics of an image using spatio-temporal filters. When the edge direction is not fixed horizontally/vertically/temporally, the 3D BPF 330 performs 2D or 3D band pass filtering in all directions. The 3D BPF continuously carries out comb filtering, 1D band pass filtering, frame comb filtering and 2D/3D band pass filtering according to the spatio-temporal local characteristics of the image.

The video signal processing apparatus according to the present invention adaptively performs local comb filtering/1D band pass filtering/frame comb filtering or 2D/3D band pass filtering in all directions in a continuous manner according to spatio-temporal local characteristics of an image in the NTSC system. Thus, the video signal processing apparatus of the present invention may detect edges of an image more accurately than a conventional apparatus that discretely selects filtering methods and stably separates the Y and C signals. Accordingly, artifacts such as cross-luma and cross-color may be removed when the video signal processing apparatus of the present invention is used in a display system, resulting in improvement of display quality of the display system.

Exemplary embodiments of the present invention have been disclosed herein, and although specific terms are employed, they are used and are to be interpreted in a generic and descriptive sense only and not for purpose of limitation. For example, while embodiments of the present invention has been described relative to a hardware implementation, the processing of present may be implemented in software, e.g., by an article of manufacture having a machine-accessible medium including data that, when accessed by a machine, cause the machine to separate the Y and C components. Accordingly, it will be understood by those of ordinary skill in the art that various changes in form and details may be made without departing from the spirit and scope of the present invention as set forth in the following claims.

What is claimed is:

1. A video signal processing method comprising:
    generating a plurality of 2D weight coefficients and 3D weight coefficients using data of a plurality of frames of an input video signal; and
    generating a C signal of the input video signal, including convoluting a horizontal coefficient mask, a vertical coefficient mask and a temporal coefficient mask, the masks respectively composed of the plurality of 2D and 3D weight coefficients with corresponding data windows of the data of the plurality of frames,
    wherein convoluting includes local vertical comb filtering, horizontal band pass filtering, frame comb filtering and 2D/3D band pass filtering according to spatio-temporal local characteristics of the input video signal.

2. The method as claimed in claim 1, wherein the video signal processing method is used in an NTSC system.

3. The method as claimed in claim 1, wherein convoluting further comprises:
    performing local vertical comb filtering when the local characteristics of the input video signal indicate high vertical correlation, local horizontal band pass filtering when the local characteristics of the input video signal indicate high horizontal correlation;
    performing local frame comb filtering when the local characteristics of the input video signal indicate high temporal correlation; and
    performing 2D or 3D band pass filtering when the local characteristics of the input video signal indicate high or low correlation in multiple directions using at least three field data of sequential frames.

4. The method as claimed in claim 1, wherein generating the C signal further comprises:
    convoluting a first data window of a first field data of the input video signal with a first filter mask;
    convoluting a second data window of a second field data of the input video signal with a second filter mask;
    convoluting a third data window of a third field data of the input video signal with a third filter mask; and
    combining the convolution results to output the C signal,
    wherein the first, second and third filter masks are generated by 3D-convoluting the horizontal coefficient mask, the vertical coefficient mask and the temporal coefficient mask.

5. The method as claimed in claim 4, wherein the first field data and the second field data have an interval of one frame between them and the second field data and the third field data have an interval of one frame between them.

6. The method as claimed in claim 4, wherein the horizontal coefficient mask, the vertical coefficient mask and the temporal coefficient mask are each one-dimensional.

7. The method as claimed in claim 4, wherein each data window comprises:
    vertical and horizontal data having C component phases opposite to a C component phase of a current pixel of each field; and
    diagonal data having a same C component phase as the current pixel.

8. The method as claimed in claim 1, wherein the 2D weight coefficients comprise:
    a first coefficient proportional to vertical and upward correlations with a current pixel;
    a second coefficient proportional to vertical and downward correlations with the current pixel; and
    a third coefficient proportional to horizontal and leftward correlations with the current pixel and a fourth coefficient proportional to horizontal and rightward correlations with the current pixel.

9. The method as claimed in claim 1, wherein the 3D weight coefficients comprise:
    a first coefficient proportional to a correlation between a current pixel and a pixel one frame prior to the current pixel; and
    a second coefficient proportional to a correlation between the current pixel and pixel one frame after the current pixel.

10. The method as claimed in claim 1, further comprising subtracting the generated C signal from the input video signal to generate a Y signal.

11. A video signal processing apparatus, comprising:
    a weight determination unit to generate a plurality of 2D weight coefficients and 3D weight coefficients using data of a plurality of frames of an input video signal; and
    a filter to convolute a horizontal coefficient mask, a vertical coefficient mask and a temporal coefficient mask, masks respectively composed of the weight coefficients with corresponding data windows of the data of the plurality of frames to generate a C signal of the input video signal,
    wherein the filter adaptively performs local vertical comb filtering, horizontal band pass filtering, frame comb filtering and 2D/3D band pass filtering according to spatio-temporal local characteristics of the input video signal.

12. The apparatus as claimed in claim 11, wherein the video signal processing apparatus is used in an NTSC system.

13. The apparatus as claimed in claim 11, wherein the filter performs:
    local vertical comb filtering when the local characteristics of the input video signal indicate high vertical correlation;
    local horizontal band pass filtering when the local characteristics of the input video signal indicate high horizontal correlation;
    local frame comb filtering when the local characteristics of the input video signal indicate high temporal correlation; and
    2D or 3D band pass filtering when the local characteristics of the input video signal indicate high or low correlation in multiple directions using at least three field data of sequential frames.

14. The apparatus as claimed in claim 11, wherein the filter comprises:
    a first filter to convolute a first data window of a first field data of the input video signal with a first filter mask;
    a second filter to convolute a second data window of a second field data of the input video signal with a second filter mask;
    a third filter to convolute a third data window of a third field data of the input video signal with a third filter mask; and
    a combiner to combine the convolution results of the first, second and third filters to generate the C signal, wherein the first, second and third filter masks are generated by 3D-convoluting the horizontal coefficient mask, the vertical coefficient mask and the temporal coefficient mask.

15. The apparatus as claimed in claim 14, wherein the first field data and the second field data have an interval of one frame between them and the second field data and the third field data have an interval of one frame between them.

16. The apparatus as claimed in claim 14, wherein the horizontal coefficient mask, the vertical coefficient mask and the temporal coefficient mask are each one-dimensional.

17. The apparatus as claimed in claim 14, wherein each data window includes vertical and horizontal data having C component phases opposite a C component phase of a current pixel and diagonal data having a same C component phase as the current pixel.

18. The apparatus as claimed in claim 11, wherein the 2D weight coefficients comprise:
   a first coefficient proportional to vertical and upward correlations with a current pixel;
   a second coefficient proportional to vertical and downward correlations with the current pixel;
   a third coefficient proportional to horizontal and leftward correlations with the current pixel; and
   a fourth coefficient proportional to horizontal and rightward correlations with the current pixel.

19. The apparatus as claimed in claim 11, wherein the 3D weight coefficients comprise:
   a first coefficient proportional to a correlation between a current pixel and a pixel one frame prior to the current pixel; and
   a second coefficient proportional to a correlation between the current pixel and pixel one frame after the current pixel.

20. The apparatus as claimed in claim 11, further comprising a subtracter to subtract the C signal generated by the filter from the input video signal to generate a Y signal.

* * * * *